Patented Aug. 12, 1941

2,252,091

UNITED STATES PATENT OFFICE 2,252,091

MOISTUREPROOF SHEET

Philipp Müller, Wiesbaden-Sonnenberg, and Otto Herrmann, Wiesbaden, Germany, assignors to E. I. du Pont de Nemours & Company, Wilmington, Del., a corporation of Delaware No Drawing. Application August 13, 1938, Serial No. 224,819. In Germany August 23, 1937

13 Claims. (Cl. 91—68)

This invention relates to coated sheets or films and it particularly pertains to regenerated cellulose film coated with a moistureproofing composition which tenaciously adheres to or is anchored to the base film even when in direct contact with water for prolonged periods of time or when used as a wrapping tissue directly in contact with products containing large amounts of water or moisture. The invention also pertains to methods for producing such coated sheets or films.

Ordinary sheets or films of regenerated cellulose have been rendered moistureproof by coating with a moisture-proofing composition comprising in its preferred form a flowable solution of a cellulose derivative, a wax or wax-like material, a blending agent and a plasticizer. These coated sheets or films are very effective as a wrapping material for such products as bread, cake, candy, or the like which it is desired to maintain in substantially their original fresh condition without any change in moisture content. Such coated sheets or films, when used as a wrapping material which is directly held in contact with products having an exceedingly high water or moisture content, such as butter, cheese, wet or frozen fish, ice cream or the like, and when such articles are kept over long periods of time in storage, have the disadvantage that the moistureproof coating tends to loosen and/or flake off from the sheet of regenerated cellulose and to thereby lessen the moistureproof quality of the wrapping material.

It is an object of this invention to provide a flexible, substantially odorless, non-fibrous cellulosic sheet or film having a surface coating which will adhere tenaciously to the cellulosic sheet or film. A further object comprises the production of films of this character having a moistureproofing coating comprising a cellulose derivative, a wax or wax-like material, a blending agent and a plasticizer. A still further object of the invention comprises a simple, workable process, directly applicable to existing equipment, such as is used for the manufacture of regenerated cellulose sheets or films, for producing products having the characteristics described.

A further object of the invention resides in the production of transparent, flexible, non-fibrous, cellulosic sheets or films prepared by precipitation from an aqueous cellulosic dispersion, coated and/or sized with a polymerization product obtained by mixed polymerization from polymerizable compounds containing an olefinic double bond, and ethylene-alpha, beta-dicarboxylic acids, their anhydrides or derivatives, and having a moistureproof surface coating which remains firmly anchored to the cellulosic sheet or film even when in direct contact with water over a prolonged period of time.

Other objects of the invention will appear hereinafter.

These objects are accomplished by the following invention which, in its preferred form, contemplates forming a cellulosic sheet or film, applying to said sheet or film a surface coating having moistureproofing characteristics and applying directly to the cellulosic base and intermediate said base and the surface coating, a coating and/or sizing of a polymerization product obtained by mixed polymerization from polymerizable compounds containing an olefinic double bond, and ethylene-alpha, beta-dicarboxylic acids, their anhydrides or derivatives.

The following examples illustrate modes of applying the principles of the invention.

Example I

A sheet of regenerated cellulose in the gel state, which has been cast from viscose, desulfured, bleached, and washed free from impurities in the usual manner on the casting machine, is led through an aqueous glycerin bath which contains 4⅓% by weight of glycerin. The sheet of regenerated cellulose is then dried until it contains not to exceed 10% of water, based on the weight of the cellulose.

The sheet is then passed through a solution containing 1 part of the condensation product of maleic anhydride and vinyl methyl ether in 70 parts methyl acetate and 30 parts cyclohexanone. The excess is removed from the sheet by means of squeeze rolls or doctor knives, and the sheet dried at a temperature of 80–100° C. The weight of the coating obtained in this way amounts to about 0.03 gram per square meter.

The film treated in this way is then coated with a moistureproofing composition of the following formula:

| | Parts by weight |
|---|---|
| Pyroxylin | 6.75 |
| Gum dammar | 1.64 |
| Dibutyl phthalate | 2.80 |
| Paraffin, M. P. 60–61° C. | 0.48 |
| Zinc stearate | 0.15 |
| Ethyl acetate | 56.34 |
| Toluene | 28.53 |
| Alcohol | 3.20 |
| Acetone | 0.11 |

The sheet is passed through the moistureproofing composition, the excess of which is removed by scraping or any suitable means, and the coated sheet is dried at a temperature above the melting point of the wax, after which the finished sheet may be conditioned if necessary to bring it to the desired moisture content. The resulting product is a sheet of regenerated cellulose with a moistureproofing coating, which is substantially odorless, transparent, flexible, and moistureproof, and to which, by virtue of the sheet being coated or sized with the condensation product of maleic anhydride and vinyl methyl ether, the moistureproof coating adheres or is anchored very tenaciously when the sheet is in direct contact with water or is used as a wrapping directly in contact with products containing large amounts of water or moisture such as butter, cheese, wet or frozen fish, ice cream or the like for very substantial periods of time. The coated sheet can be laid into boiling water for half an hour without loosening the lacquer layer, whereas a lacquer coating prepared without this pretreatment can stand such a treatment only for a few minutes.

*Example II*

A dry sheet of glycol cellulose is passed through an aqueous solution of glycerol containing 4½% by weight of glycerol. The sheet is dried by passing the same over drier rolls until it contains not to exceed 10% of water, based on the weight of the cellulose.

The glycerinated glycol cellulose sheet is then passed through a solution containing 0.2 parts by weight of the condensation product of maleic anhydride and vinyl octadecyl ether, 40 parts by weight benzol, 30 parts by weight butyl acetate, and 30 parts by weight cyclohexanone. The excess solution is thoroughly scraped from the film by means of scraper knives, and the film is dried at a temperature of 80–100° C. This treatment produces a coating on the sheet of about 0.01 grams of the condensation product on 1 square meter of the sheet.

The sheet is subsequently coated with a moisture-proofing composition comprising a solution of nitrocellulose, gum dammar, paraffin, and dibutyl phthalate. The excess moistureproofing material is removed as described in the preceding example and the sheet is then dried. The moistureproofing coating is found to adhere to the glycol cellulose sheet exceedingly well.

This invention contemplates, as a base, any smooth, dense, non-porous, non-fibrous cellulosic sheet or film which may be precipitated from an aqueous cellulosic dispersion. Thus, the scope of the invention includes the use of sheets or films of regenerated cellulose, whether precipitated from solutions of viscose, cuprammonium cellulose, or any other aqueous solution or dispersion of cellulose, and it also contemplates the use of sheets or films of such cellulose esters and ethers as are precipitated from aqueous solutions or dispersions, such as glycol cellulose, cellulose glycolic acid, methyl cellulose and ethyl cellulose of low alkyl content, cellulose phthalate, and other cellulose products similar to those described. When any given coating composition is applied to such cellulosic sheets or films, the coating composition will not penetrate therethrough and will normally result in a surface coating. It is desired to emphasize the fact that the preferred form of the invention is directed to the treatment of regenerated cellulose sheets or films since it is in this form that the invention may be applied with the greatest advantages.

As a surface coating, the invention contemplates the use of any coating composition containing a cellulose derivative base, such as cellulose nitrate, cellulose acetate, ethyl cellulose, benzyl cellulose or the like, which may be modified as desired by the addition of blending agents, waxes, plasticizers, etc. In its preferred form, this invention contemplates as a surface coating a moistureproofing coating comprising a cellulose derivative, a wax or wax-like material or other moistureproofing agent, a blending agent and a plasticizer. Such moistureproofing compositions are disclosed in Charch and Prindle U. S. Patent No. 1,737,187 issued November 26, 1929.

The invention also contemplates the anchoring to a cellulosic base of moistureproofing coatings which may not contain cellulosic material, e. g., rubber-wax or resin-wax coatings, and includes also the anchoring of coatings which may conceivably be used for purposes other than moistureproofing.

The anchoring agents contemplated by the present invention are the polymerization products which may be obtained by polymerizing together a compound of the following formula:

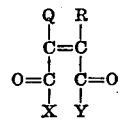

wherein Q and R stand for hydrogen, alkyl, aryl or aralkyl, X and Y stand for OH, O-alkyl, O-aryl or halogen or X and Y together stand for oxygen; and an organic compound capable of being polymerized and containing a single $>C=CH_2$ group. The sub-generic group of compounds having the formula:

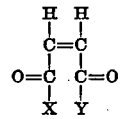

wherein X and Y have the aforementioned significance, constitute a preferred series of the invention. Such polymerization products may be formed by the interpolymerization of acids such as maleic acid, fumaric acid, itaconic acid, citraconic acid, phenyl maleic acid, benzyl maleic acid, dibenzyl maleic acid, ethyl maleic acid or anhydrides or other derivatives of these acids with vinyl compounds such as vinyl esters, vinyl ethers, vinyl halides or acrylic acids, acrylic esters or cinnamic acid esters. Polymerization products which contain anhydride groups are of particular value. In case the polymerization products are obtained with the aid of acids of the above mentioned formula or derivatives of the said acids other than anhydrides, anhydride groups can be produced in the polymerization products by heating the products, if necessary after saponifying them. The mentioned compounds may be prepared, for example, by the methods outlined in the patent to Voss et al. No. 2,047,398. The polymerization products are dissolved in suitable solvent mixtures so that the cellulose sheeting will be thoroughly wet therewith. It is furthermore desired that the anchoring layer be formed on the sheet in an exceedingly thin coating. It is preferred that the anchoring layer be made thinner than $\frac{1}{1000}$ mm. and, if possible, down to $\frac{1}{100000}$ mm.

Particularly desirable results may be obtained when the cellulosic films, prior to the application of the anchoring agent, contain a hydroxylated softener such as glycerin, glycol or the like.

Any suitable concentration of the polymeric anchoring agent may be employed for application to the cellulosic sheeting, depending upon the method of operation used and the amount of anchoring agent which it is desired to have present in the finished cellulosic sheeting. In general, it is preferred to use solutions in which the concentration of the anchoring agent is equivalent to between .1% and 2% by weight.

The present invention effects the production of flexible, substantially odorless, non-fibrous, non-porous cellulosic sheets or films having a moistureproofing coating securely anchored to the film base and resistant to deterioration when subjected to the action of liquid water over long periods of time. Further advantages are the adaptability of the process of the invention to equipment now used for the production of regenerated cellulose film and the like, without necessitating a substantial change in the design of such equipment; lower cost, minimum waste and great efficiency. Where no pigment is used, the composite films have a high degree of transparency.

Although the present invention is limited to the anchoring of moistureproofing coating compositions to non-fibrous cellulosic film, the invention has great utility in the anchoring of various types of coatings to such non-fibrous cellulosic films. For example, the present invention is particularly suitable for the anchoring of a layer of a permanently plastic adhesive having a rubber base to one side of a sheet of non-fibrous cellulosic material such as regenerated cellulose. For instance, one side of a sheet of non-fibrous cellulosic material may be coated with an anchoring agent and dried in accordance with the two above described examples, and the dried coated sheet further coated with a layer of a permanently plastic adhesive of the type having a rubber base. Such a film in comparison with the usual cellulosic films has the advantage that the seams glued therewith do not loosen even under the influence of water.

While the invention has been described particularly with respect to transparent wrapping tissues, it will be understood that, within its broad scope, the invention includes the anchoring of coatings to sheets which are thicker than wrapping tissues. The invention is also applicable to the anchoring of coatings to tubes, sausage casings, bottle caps and bands, molded articles and, in general, to any articles of cellulose or similar material of the character described, where the problem of anchoring coatings arises.

Additionally, the present invention may be used to improve the anchorage of various coatings to bases other than those specifically noted above, for example, paper, cotton cloth, and other bases which are water sensitive, i. e., will absorb water, the anchoring agents improving the adhesion between the coating and base over that exhibited where the coating is applied to the base in the absence of the anchoring agent.

For the purpose of this invention, moistureproof materials are defined as those which, in the form of a thin, continuous and unbroken film, will permit the passage of not more than 690 grams of water vapor per 100 square meters per hour, over a period of 24 hours at approximately 39.5° C.±0.5° C., the relative humidity of the atmosphere at one side of the film being maintained at least at 98% and the relative humidity of the atmosphere at the other side being maintained at such value as to give a humidity differential of at least 95%.

Moistureproofing coating compositions are defined as those which, when laid down in the form of thin, continuous, unbroken films, applied uniformly as a coating with a total thickness not exceeding 0.0005" to both sides of a sheet of regenerated cellulose of thickness approximately 0.0009", will produce a coated product which is moistureproof.

A moistureproofed regenerated cellulose sheet is capable of resisting the passage of moisture or water vapor at least ten times as effectively as the uncoated regenerated cellulose sheet.

Parts, proportions and/or percentages referred to throughout the specification and claims are to be construed as parts, proportions and/or percentages by weight unless indicated otherwise.

Any variation of or modification of the invention, as it has been described above in this application, which conforms to the spirit of the invention, is intended to be included within the scope of the claims.

We claim:

1. A composite film suitable for use as a wrapping tissue comprising a water-sensitive, non-fibrous base, a moistureproofing coating, and an intermediate coating comprising the polymerization product of maleic anhydride and vinyl methyl ether.

2. A composite film suitable for use as a wrapping tissue comprising a water-sensitive, non-fibrous base, a moistureproofing coating, and an intermediate coating comprising the polymerization product of maleic anhydride and vinyl octadecyl ether.

3. A composite sheet suitable for use as a wrapping tissue comprising a water-sensitive, non-fibrous base, a moistureproofing coating and an intermediate coating comprising the polymerisation product of maleic anhydride and an ether of the vinyl alcohol.

4. A composite sheet suitable for use as a wrapping tissue comprising a sheet of regenerated cellulose, a moistureproofing coating and an intermediate coating comprising the polymerisation product of maleic anhydride and an ether of the vinyl alcohol.

5. A wrapping tissue comprising a regenerated cellulosic film base, a moistureproofing surface coating comprising a film-forming ingredient and a wax material and an intermediate anchoring lamina comprising essentially the polymerization product obtained by polymerizing together maleic anhydride and a vinyl ether.

6. A wrapping tissue comprising a softened regenerated cellulosic film base, a moistureproofing surface coating comprising a film-forming ingredient and a wax material and an intermediate anchoring lamina comprising essentially the polymerization product obtained by polymerizing together maleic anhydride and vinyl methyl ether.

7. A wrapping tissue comprising a glycerinated water-sensitive, non-fibrous, cellulosic base, a moistureproofing surface coating and an intermediate coating, the said moistureproofing coating comprising a cellulose derivative film-former and a wax moistureproofing agent, the said intermediate coating comprising essentially the polymerization product obtained by polymerizing together a member of the group consisting of maleic acid, fumaric acid, itacomic acid, citraconic acid, phenyl maleic acid, benzyl maleic acid, dibenzyl maleic acid, ethyl maleic acid and their anhydrides with a member of the group consisting of vinyl esters, vinyl ethers, vinyl halides, acrylic acids, acrylic esters and cinnamic acid esters.

8. A wrapping tissue comprising a softened regenerated cellulosic film base, a moistureproofing surface coating comprising a film-forming ingredient and a wax material and an intermediate anchoring lamina comprising essentially the polymerization product obtained by polymerizing together maleic anhydride and vinyl octadecyl ether.

9. The product of claim 5 when the base sheet is softened with glycerol.

10. The product of claim 6 when the base sheet is softened with glycerol.

11. The product of claim 7 when the base sheet is softened with glycerol.

12. The product of claim 8 when the base sheet is softened with glycerol.

13. The product of claim 2 when the base sheet is glycol cellulose softened with glycerin.

PHILIPP MÜLLER.
OTTO HERRMANN.